US007845484B2

(12) United States Patent
Zimmermann

(10) Patent No.: US 7,845,484 B2
(45) Date of Patent: Dec. 7, 2010

(54) STORAGE MODULE FOR FLAT POSTAL ITEMS WITH LAST-IN/FIRST-OUT OPERATION

(75) Inventor: Armin Zimmermann, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 113 days.

(21) Appl. No.: 11/823,725

(22) Filed: Jun. 28, 2007

(65) Prior Publication Data

US 2008/0006509 A1 Jan. 10, 2008

(30) Foreign Application Priority Data

Jun. 28, 2006 (DE) ...................... 10 2006 030 093

(51) Int. Cl.
*B65G 1/00* (2006.01)
*B65H 3/00* (2006.01)
*B65H 5/22* (2006.01)
*B65H 83/00* (2006.01)
*B65H 1/02* (2006.01)
*B65H 29/38* (2006.01)
*B65H 31/04* (2006.01)

(52) U.S. Cl. ................ 198/347.1; 198/347.2; 271/3.12; 271/3.01; 271/149; 271/150; 271/177; 414/797.6; 414/797.2; 414/797.3; 414/797.4

(58) Field of Classification Search ............. 198/347.1, 198/347.2; 414/797.6, 797.2, 797.3, 797.7; 271/3.12, 3.01, 149, 150, 177, 213, 214
See application file for complete search history.

(56) References Cited

U.S. PATENT DOCUMENTS

| | | | | |
|---|---|---|---|---|
| 4,302,000 | A * | 11/1981 | Frank | 271/150 |
| 4,682,768 | A * | 7/1987 | Iida et al. | 271/3.01 |
| 4,778,062 | A | 10/1988 | Pavie et al. | |
| 5,104,109 | A * | 4/1992 | Kubo | 271/3.12 |
| 5,451,038 | A * | 9/1995 | Hosking et al. | 271/3.01 |
| 7,159,861 | B2 * | 1/2007 | Duesterhus | 271/3.01 |
| 2004/0245698 | A1 * | 12/2004 | Naruoka et al. | 271/10.11 |

FOREIGN PATENT DOCUMENTS

| | | |
|---|---|---|
| DE | 1286966 B | 1/1969 |
| EP | 0 364 790 A2 | 4/1990 |

* cited by examiner

*Primary Examiner*—Gene Crawford
*Assistant Examiner*—Yolanda Cumbess
(74) *Attorney, Agent, or Firm*—Laurence A. Greenberg; Werner H. Stemer; Ralph E. Locher

(57) ABSTRACT

A storage module for flat postal items includes a storage area, an infeed function to transfer postal items from a stream of postal items into the storage area, and an extraction function to extract postal items from the storage area. The infeed and extraction function have a common roller conveyor unit and a feed stop. The infeed function guides the postal items in a direction of travel of the roller conveyor unit from the roller conveyor against the feed stop for a transfer into the storage area. The extraction function extracts the last stacked postal item from the storage area in the direction of travel of the roller conveyor unit through an extraction opening. The storage area includes a separating knife to exert a first pressure and a second pressure.

13 Claims, 3 Drawing Sheets

FIG 3B Start
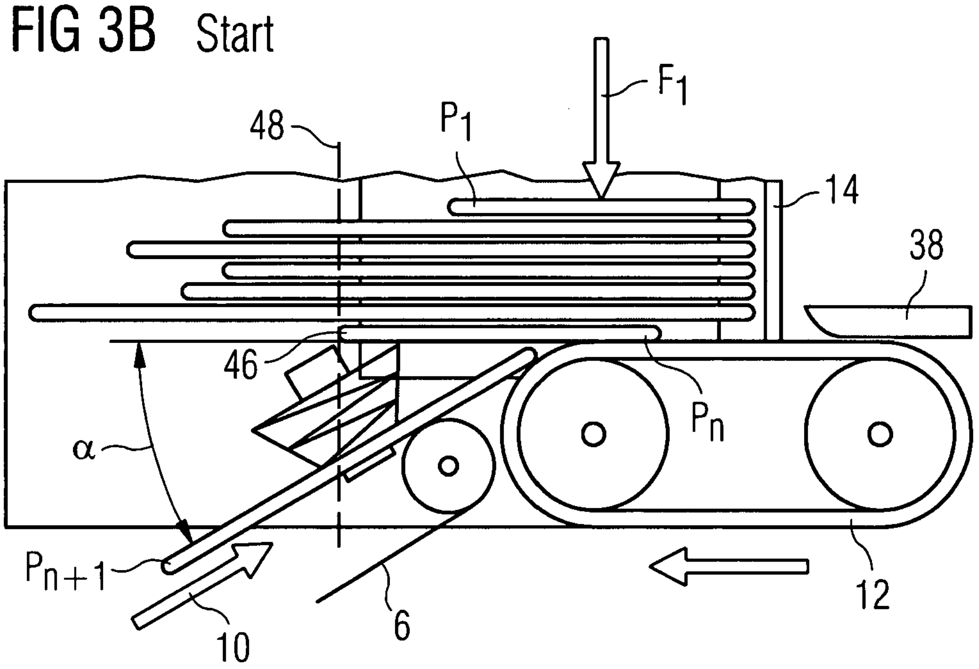
FIG 3A Stop
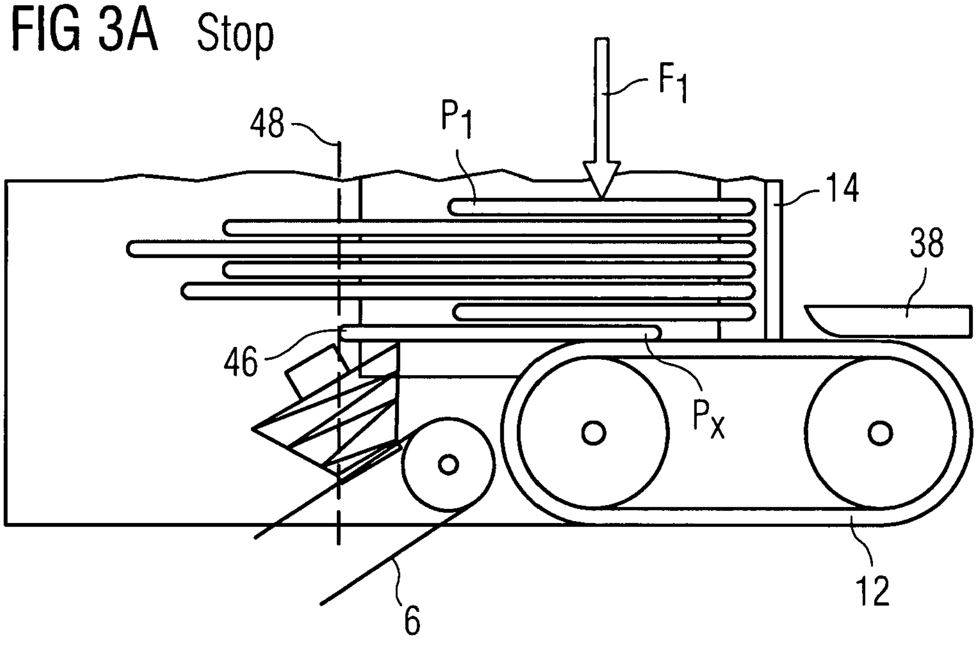

STORAGE MODULE FOR FLAT POSTAL ITEMS WITH LAST-IN/FIRST-OUT OPERATION

BACKGROUND OF THE INVENTION

The present invention relates to a storage module for flat postal items having a storage area and an infeed function, which transfers postal items from a stream of postal items into the storage area, and an extraction function, which extracts postal items from the storage area.

With today's postal sorting systems, very large quantities of postal items sometimes have to be sorted and distributed in so-called mail centers and/or larger post offices. By way of example, the average daily amount of post received in Germany is about 80 million letters, which must reach their addressees the very next day or at the latest on the next day but one after posting. Postal items of this kind are, for example, letters. It is characteristic of these postal items that the length and the width of these postal items are generally large compared with their height. There are significant differences between the postal administration authorities of the different national states regarding the definitive dimensions for assigning postal items to this group of "letters". As well as these size variations, it can also easily be seen that the nature of postal items, even when they are all "letters", differs considerably from one to another under certain circumstances.

It is therefore easy to imagine that postal automation processes today have to be operated with a high degree of efficiency and, as a result of cost pressure, also with a comparatively low number of operators. To achieve sufficiently large throughput rates in the sorting machines, the postal items are conveyed through the sorting machine at speeds of up to 4 m/s and in places even more, and are sorted to their target location by means of appropriately switched diverters and a sophisticated, usually multi-stage delivery route sequence sorting method.

For correct feeding of the postal items it is therefore essential that the address of the postal item can be cleanly read by machine at least at the beginning of the sorting process. Frequently, however, the address cannot be read by the machine but must be added by manually entering the address (or at least the part thereof, which is significant for the current sorting process). This fact makes it necessary that the non-machine-readable postal items have to be channeled out of the sorting process, buffered in a storage module and, after manual assignment of the address, extracted from the store once more and fed into the sorting process.

As well as this, there are naturally a large number of other situations in the sorting process, such as a fault in the sorting path, for example, which make it necessary that postal items have to be temporarily buffered and later fed back into the sorting process.

The storage modules known today, which can contribute to an extensively automated sorting process, usually work on the first-in/first-out principle. The postal items, which are usually transported standing upright and lying on the long edge, are thus accumulated on one side of the stored stack, i.e., on the "top side" of the stack, for example, and extracted from the stack once more on the respective opposite side of the stack (in the terminology chosen in the example, then on the "bottom side"). In doing so, the stacking device acts on the beginning of the stack and the extraction device on the end of the stack, which as a result leads to a kind of tensioned compression spring, which corresponds to the stack of postal items. It is evident that, with this situation, approximately the same average pressure is produced both at the stacking device and also at the extraction device. In order to be able to carry out the task of stacking and extraction reliably, however, different pressures would really be required at the stacking device and at the extraction device. The average pressure that can only be set as a compromise at both ends of the stack therefore leads time and time again to process faults, which manifest themselves, for example, in folding-up or bending or inadequate drawing-in of postal items to the stacking device and faulty extraction or poorly aligned postal items at the extraction device.

SUMMARY OF THE INVENTION

The present invention is therefore based on the object of improving a storage module so that the tasks of storage and extraction can be carried out with an exceedingly low process fault rate.

According to the invention, this object is achieved by a storage module of the kind mentioned in the introduction, in which the infeed and extraction function include a common roller conveyor unit and a feed stop, wherein optionally the infeed function or the extraction function can be carried out in that, in the infeed function, the postal items can be guided in the direction of travel of the roller conveyor unit from the roller conveyor against the feed stop and can thus be transferred into the storage area, and in that, in the extraction function, the last stacked postal item can be extracted from the storage area in the direction of travel of the roller conveyor unit through an extraction opening.

In this way, however, it is possible, while extensively using common components for the infeed and extraction function, to functionally separate the feeding-in or storage of postal items in the stack and the extraction of postal items, which at this stage of the process are usually conveyed in essentially vertical orientation for reasons of expediency, from the stack, and thus to be able to set up the respectively most favorable process parameters for each of the two processes. Unlike the first-in/first-out mode of operation (FIFO) known from the prior art, in this way a last-in/first-out mode of operation can be achieved, which, when storing, can concentrate completely on fulfilling the best possible storage boundary conditions and, when extracting, can concentrate completely on fulfilling the best possible extraction boundary conditions.

The feed stop, which is particularly important for storage and which makes it possible to center the postal items on two side edges of the postal item for later accurate extraction, is rather counterproductive for the extraction function, because, with the extraction from the storage area, the postal items should preferably continue to be fed in the original feed direction. The extraction function can therefore be constructively implemented particularly easily when the feed stop can be moved in the stacking direction (direction in which the stack grows in the storage area) in order to produce the extraction opening. The last stored postal item is therefore then conveyed in the storage area by the roller conveyor unit essentially in the orientation of the postal item (or anyway conveyed in a vectorial transition, which still has a noticeable component in storage orientation) and can thus for example be fed into the running stream of postal items.

The contact pressures with the roller conveyor unit, which are respectively optimized for the infeed function and the extraction function, can be particularly well realized when the storage area includes a separating knife with which, in the case of the infeed function, a first pressure can be exerted antiparallel to the stacking direction on at least part of the postal items stored in the storage area, and with which, in the case of the extraction function, a second pressure can be exerted antiparallel to the stacking direction on at least part of the postal items stored in the storage area. Here, the stacking direction means the direction in which the stack grows when postal items are continuously fed into the storage area. Advantageously, this separating knife can be driven by means of an underfloor belt or also separately, which in this way is able to produce a constant contact pressure against the roller conveyor, independent of stack size, for each postal item that is fed against the roller conveyor unit.

In a further advantageous embodiment of the invention, in order to achieve particularly suitable contact conditions against the postal items that are currently being conveyed by means of the roller conveyor unit for storage or extraction, provision can be made to set up the first pressure depending on at least one characteristic of the postal item currently to be stored and/or to set up the second pressure depending on at least one characteristic of the last postal item stored. Examples of such a characteristic can be the thickness and/or the length of a postal item or also the surface texture of a postal item.

Typically, for particular postal sorting machines, certain limiting values for the postal items, which can be processed with these sorting machines, are defined in agreement with a (postal) customer. Limiting values of this kind are primarily the dimensions of the postal items, i.e. their minimum and maximum width, length and height, and then secondly also their weight or their external character for example. In an advantageous embodiment of the invention, the roller conveyor unit, which guides the postal items in the infeed function against the feed stop, can therefore be dimensioned so that a section of a driven roller conveyor, which is incorporated into the roller conveyor unit and faces the storage area, is shorter than a defined shortest postal item length. In this way, the storage process can be supported in as far as the roller conveyor does not grip the whole postal item and thus does not convey the postal item too hard against the feed stop with the driving force that is transferred by friction, as a result of which process faults (bent postal item and blocking of the process) at this point can be even better avoided.

A different starting position from this can be considered to exist for the extraction of the postal items from the storage area. Now that the stored postal items are arranged in the storage area very cleanly centered on two edges, for the optimal further processing (further conveying) of the postal items there is a requirement to be able to extract the postal items from the storage area in a very defined manner. A parameter that has already been mentioned above, which supports the extraction process, is the choice of the right contact pressure of the last stored postal item against the roller conveyor unit. This process can be supported particularly advantageously when, in the case of the extraction function, at least one pivotable support roller is provided for supporting the last stored postal item, the at least one support roller being pivoted out of the way in the case of the infeed function. This at least one support roller, which is really only needed for the extraction function and is therefore pivoted in during the extraction function, ensures that the whole postal item is laid out essentially parallel with the conveyor level of the roller conveyor and therefore the driving force of the roller conveyor can be transmitted very uniformly to the part of the postal item, which is in contact with the roller conveyor.

For the infeed function, as well as an optimized first pressure, a series of other parameters can be identified, which support the prevention of process faults. An example of such a parameter can be the direction in which the postal items are fed into the roller conveyor unit. In an advantageous embodiment of the invention, the direction in which the postal items are fed into the stream of postal items can be set so that the feed direction runs at an angle to the alignment of the postal items in the storage area. In this way, the aspiration can be supported that, when being fed into the storage area, the postal item is only in contact with the roller conveyor from a drive point of view towards the end of this process, thus resulting in a defined feed against the feed stop.

In a further advantageous embodiment of the invention, the roller conveyor unit can include a roller conveyor, which is driven by means of a servo motor. In this way, a jointly used roller conveyor is provided both in the infeed function and in the extraction function, which also has a very advantageous effect from a design point of view.

As an alternative to this, however, it could also be provided that the roller conveyor unit includes two separately driveable roller conveyors, wherein, during the infeed function, one of the two roller conveyors is in frictional contact with the postal items to be fed in and, during the extraction function, the other of the two roller conveyors can be brought into frictional contact with the postal items to be extracted from the storage area. In this way, specified roller conveyors with different coefficients of friction can be used for the respective function, for example. From a design point of view, however, this solution is a little more elaborate, because a mechanism must be available, which brings the two different conveyors into frictional engagement with the postal items depending on the selected function. Conceivable here is a pivoting device, for example, which pivots one roller conveyor into a frictional contact position while, at the same time, the other roller conveyor is swiveled out of the frictional contact position (and vice versa). A further alternative can also be an eccentric shaft, which lifts one roller conveyor into the frictional contact position and simultaneously lowers the other roller conveyor (and vice versa).

Further, it is particularly advantageous when each of the above-mentioned roller conveyors can be driven by means of a servo motor, which drives the roller conveyor with a pre-specifiable profile. In this way, for example, it is possible to drive the postal item slower at the end of the infeed movement and therefore gently against the feed stop. With very short postal items, the postal item can even be stopped in the meantime before it reaches the feed stop. For example, the stopping point can be defined as a position in which the rear edge of the comparatively short postal item (and therefore also the front edge, which is important for correct positioning) is still sufficiently far from the feed stop in order then, with the restarting of the roller conveyor, to be able to drive the postal item at the speed required for the next postal item before slowing down is initiated for the gentle approach to the feed stop.

In the case of all the components for conveying the postal items described above, in order to extensively decouple the frictional contact of the postal items from the gravitational force of the postal items, in an advantageous development of the invention, provision is made to align the postal items essentially vertically and/or to align them lying on their long edge.

Further advantageous embodiments of the invention can be seen in the remaining dependent claims.

BRIEF DESCRIPTION OF THE SEVERAL VIEWS OF THE DRAWINGS

Exemplary embodiments of the invention are explained in more detail below with reference to the attached drawings, wherein:

FIG. 3A shows in schematic representation a plan view of a snapshot in the infeed function to illustrate the control of the roller conveyor drive;

FIG. 3B shows in schematic representation a plan view of another snapshot in the infeed function to illustrate the control of the roller conveyor drive.

DETAILED DESCRIPTION OF THE INVENTION

Figure 1:
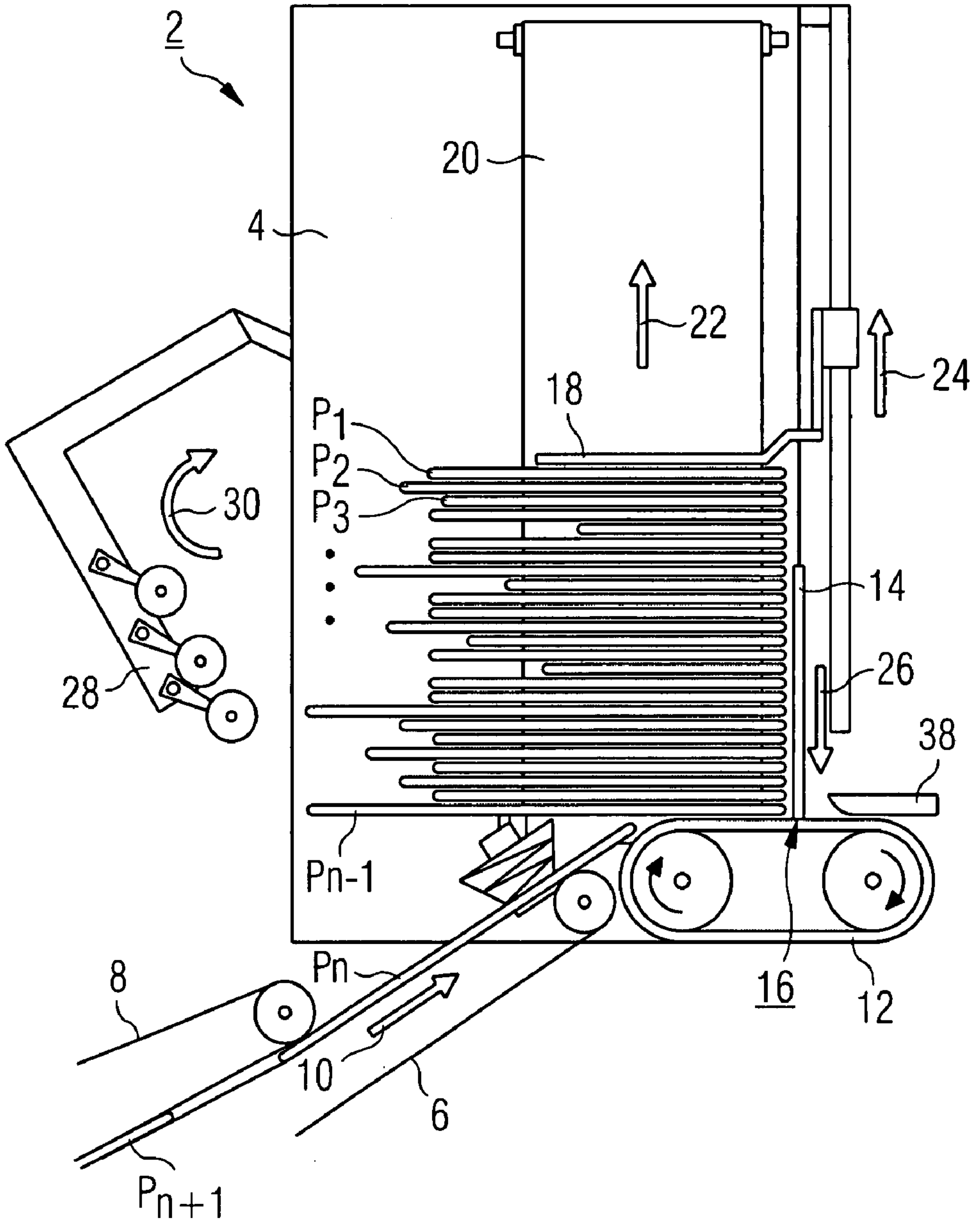
FIG. 1 shows in schematic representation a plan view on a storage module in the infeed function.
Figure 2:
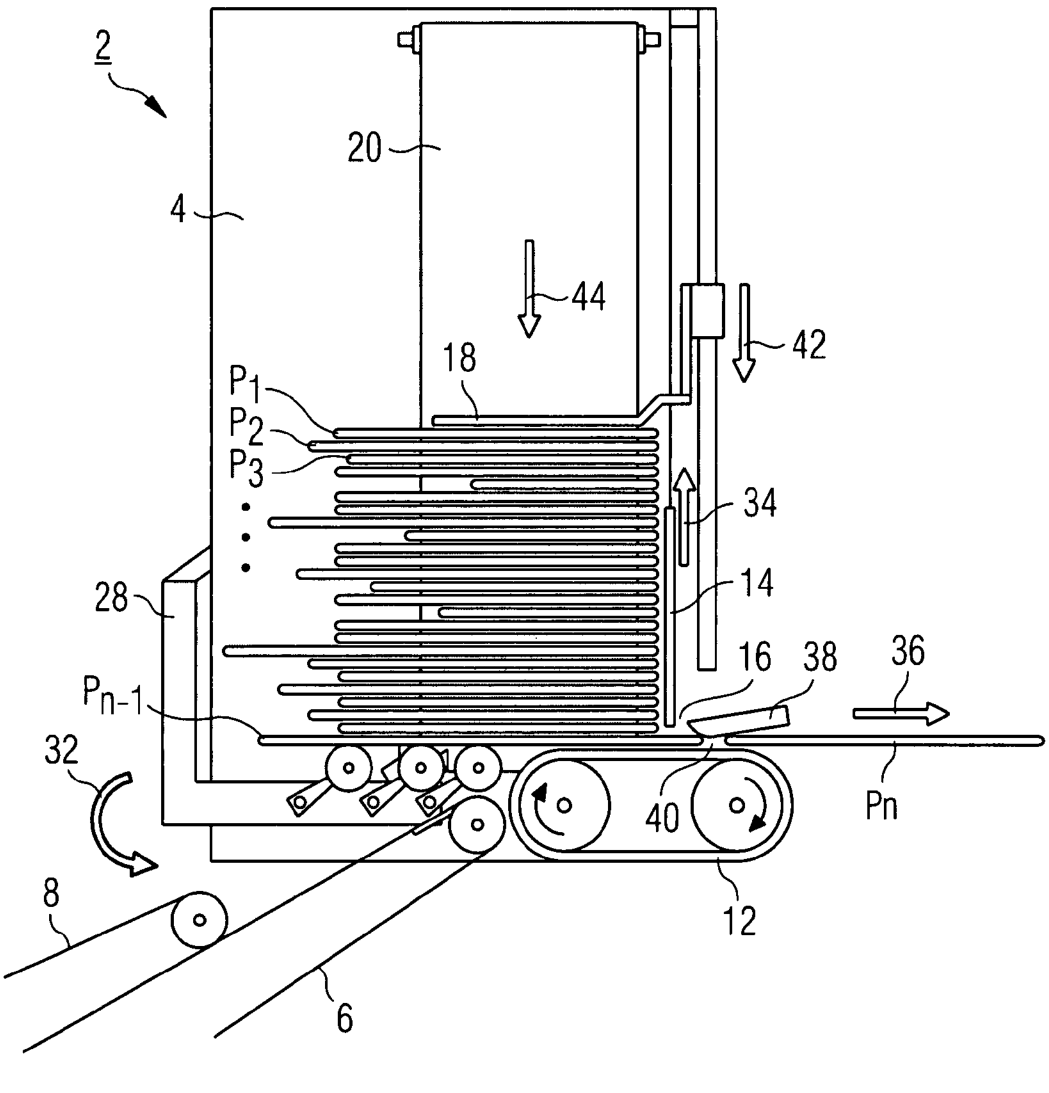
FIG. 2 shows in schematic representation a plan view on the storage module according to FIG. 1 in the extraction function.

By way of introduction it should be noted that the plan views shown in FIGS. 1 to 3 illustrate the essentially vertical orientation of the postal items. The plan views in FIGS. 1 to 3 therefore show only the top edge of the postal items in all cases.

FIG. 1 shows in schematic view a plan view on a storage module 2 according to the invention, which in the representation shown is working in the infeed function. The storage module 2 includes a storage area 4 in which postal items $P_1$, $P_2$, $P_3$, . . . , $P_{n-1}$ are currently stored. In the illustration shown, the postal item $P_n$ will be the next postal item transferred into the storage area 4. In this case, this postal item $P_n$ is fed between two feed conveyors 6, 8 to the storage module 2 in the is direction of an arrow 10—hereinafter referred to as conveyor direction 10—and then taken over by a roller conveyor 12 of the storage module 2. In doing so, the roller conveyor 12 is driven under control and conveys the postal items $P_1$, $P_2$, $P_3$, . . . , $P_{n-1}$ against a feed stop 14, as a result of which the postal items $P_1$, $P_2$, $P_3$, . . . , $P_{n-1}$ are then located in an exactly defined position in the storage area 4 with regard to their front and bottom edge. In the position shown in FIG. 1, the feed stop 14 also blocks an extraction opening 16, which will be discussed in more detail in the description relating to FIG. 2. An arrow 26 in the view shown is therefore intended to indicate that the feed stop 14 is guided (downwards) until immediately before the roller conveyor 12.

For the exact positioning of the postal items $P_1$, $P_2$, $P_3$, . . . , $P_{n-1}$ in the storage area 4 it is therefore essential that the postal items $P_1$, $P_2$, $P_3$, . . . , $P_{n-1}$ are brought into contact with the roller conveyor 12 with a certain feed contact pressure. It is easy to see that, if the feed contact pressure is too low, the postal item that is currently to be stored, here postal item $P_n$, could be conveyed only with a delay, and an unwanted overlapping with an already following postal item $P_{n+1}$ could occur. This can have the effect that the postal item $P_n$ is no longer fed quite correctly to the feed stop 14. On the other hand, in the case of postal items having low rigidity, too high a feed contact pressure can bring about a bending or folding-up of the postal item before the feed stop 14 in an unwanted manner, with the consequence that the bent/folded-up postal item would have to be smoothed again by hand. In the case of the prevailing conveyor speeds of several meters per second for postal items outside the storage area 4, it can easily be seen that any process fault will not affect only one postal item but as a rule will always affect a whole series of postal items within a conveyor path.

In order to set up an optimized feed contact pressure in this regard, a separating knife 18 and an underfloor conveyor 20 are provided, which, in the infeed function of the storage module 2, can be moved under very fine control in the stacking direction according to arrows 22, 24. A first pressure is thus produced by means of the separating knife 18 antiparallel to the stacking direction in order to set the required feed contact pressure on the roller conveyor 12 for conveying the particular postal item to be stored.

Further, the storage module 2 has a support roller arrangement 28, which, in the infeed function shown in FIG. 1, is pivoted into an inactive state. Here, an arrow 30 is intended to illustrate by way of example the pivoting direction of the support roller arrangement 28.

FIG. 2 now shows a schematic plan view on the storage module 2, which is being operated here in the extraction function. A series of components of the storage module are now in a different position compared with the infeed function. The support roller arrangement 28 is now in a pivoted-in active state, which, with regard to the pivoting direction, is also intended to be indicated by an arrow 32. Here, the supporting roller arrangement 28 ensures above all that the next postal item to be extracted, here the postal item $P_{n-1}$, is aligned in a plane, which corresponds essentially with the conveyor plane spanned by the roller conveyor 12 and also essentially corresponds with the further conveyor alignment in the close vicinity of the storage module 2. In this way, the postal item to be extracted lies flat against the roller conveyor 12 and can thus be extracted in a defined manner.

In order that the stored postal items can be extracted at all, in the extraction function in the graphical representation, the feed stop 14 is moved out of the way upwards according to arrow 34 and thus unblocks the extraction opening 16. The snapshot shown in FIG. 2 shows the postal item $P_n$, which has already been completely extracted and is being conveyed onwards in the direction of an arrow 36, and the postal item $P_{n-1}$, the front edge 40 of which is just emerging through the extraction opening 16 and is being held in contact with the roller conveyor 12 by means of a peeler 38. At the same time, the peeler 38 helps to prevent double extractions, as its coefficient of friction is matched to the frictional moment acting on the roller conveyor and, in the event of a double extraction, holds back the postal item, which is not in direct contact with the roller conveyor. In order for the postal item $P_n$ to be conveyed with a very accurately defined orientation of its front edge and the postal item $P_{n-1}$ to be currently conveyed in such a manner, an optimized extraction contact pressure of the postal item against the roller conveyor 12 is now set up here. For this purpose, a second pressure antiparallel to the stacking direction is built up by means of the separating knife 18 (cf. arrow 42). The setting of the right extraction contact pressure is also meaningful for the extraction function for preventing process faults, because too low an extraction contact pressure can lead, for example, to an unwanted slipping of the roller conveyor 12 and thereby to an inaccurate conveying of the postal item, which is currently to be extracted. On the other hand, too high an extraction contact pressure can lead to a multiple extraction or even also to jamming of the bottom postal items in the graphical representation.

In order also to be able to guarantee the extensively vertical alignment of the postal items located in the storage area 4 during the continuing extraction of postal items, the underfloor belt 20 is also driven in the direction of an arrow 44 and, in conjunction with the pre-stressed separating knife 18, thus displaces the postal items stored in the storage area 4.

FIG. 3 now shows in schematic representation a plan view on two snapshots a) and b) during the sequence of the infeed function in order to illustrate the control of the drive of the roller conveyor. Here, the snapshot a) "Stop" shows the situation for a short postal item $P_x$, which is stopped before reaching the feed stop 14. The trigger for stopping the roller conveyor 12 in this case is a rear edge 46, which reaches a limit 48 shown dotted.

The snapshot b) "Start" correspondingly shows the situation for starting the roller conveyor 12. The postal item $P_n$ was stopped when its rear edge 46 reached the limit 48. A following postal item $P_{n+1}$ now entering at an angle α makes it necessary for the postal item $P_n$ to now vacate the position, so to speak, and be fed against the feed stop 14. The remaining distance here is sufficient to bring a servo drive (which is not shown in more detail here) for the roller conveyor 12 back up to its rated speed and subsequently to brake it gently again for a gentle approach of the postal item $P_n$. These measures advantageously support the gentle approach and accurate positioning of the postal items (even particularly short ones) against the feed stop, as a result of which the process fault rate can be further favorably affected.

With the storage module 2 according to the invention, a tool for postal automation has been created, which provides an optimization of the process for feeding postal items to a storage area and for extracting postal items from the storage area. Unlike the storage modules known in the prior art, which work according to the first-in/first-out principle and therefore only allow a compromise for setting the parameters for the infeed and the extraction of the postal items in all cases, the last-in/first-out principle creates the possibility of this process automation, which works with considerably greater reliability than the devices known in the prior art.

What is claimed is:

1. A storage module for flat postal items, comprising:

a storage area;

an infeed function configured to transfer postal items from a stream of postal items into the storage area; and an extraction function configured to extract postal items from the storage area, wherein the infeed and extraction function include a common roller conveyor unit configured for rotation in only one travel direction and a feed stop, wherein the infeed function is configured so that the postal items are guided in a direction of travel of the roller conveyor unit from the roller conveyor against the feed stop for a transfer into the storage area, wherein the extraction function is configured so that a postal item that is stacked last is extractable from the storage area in the direction of travel of the roller conveyor unit through an extraction opening, the feed stop being movable in the stacking direction in order to produce the extraction opening, wherein the storage area includes a separating knife configured to exert in the infeed function a first pressure antiparallel to a stacking direction on at least part of the postal items stored in the storage area, the first pressure being set depending on at least one characteristic of a postal item currently to be stored, and to exert in the extraction function a second pressure antiparallel to the stacking direction on at least part of the postal items stored in the storage area, the second pressure being set depending on at least one characteristic of the last postal item stored.

2. The storage module of claim 1, wherein the separating knife is driveable by means of an underfloor belt or separately.

3. The storage module of claim 1, wherein a section of the roller conveyor unit, which faces the storage area, is shorter than a defined shortest postal item length.

4. The storage module of claim 1, wherein in the extraction function at least one pivotable support roller is provided for supporting the last stored postal item, the at least one support roller being pivoted out of the way in the infeed function.

5. The storage module of claim 1, wherein a direction in which the postal items are fed into the stream of postal items runs at an angle to an alignment of the postal items in the storage area.

6. The storage module of claim 1, wherein the storage area includes an underfloor belt, which is movable in or antiparallel to the stacking direction of the postal items.

7. The storage module of claim 1, wherein the roller conveyor unit includes a roller conveyor, which is driven by means of a servo motor.

8. The storage module of claim 1, wherein the roller conveyor unit includes two separately driveable roller conveyors, wherein, during the infeed function, one of the two roller conveyors is in frictional contact with the postal items to be fed in and, during the extraction function, the other of the two roller conveyors can be brought into frictional contact with the postal items to be extracted from the storage area.

9. The storage module of claim 8, wherein each roller conveyor is configured to be driven by means of a servo motor, which drives the roller conveyor with a pre-specifiable profile.

10. The storage module of claim 1, wherein the postal items are aligned to be at least one of essentially vertical and lying on long edges.

11. The storage module of claim 1, wherein the infeed function transports the postal items into the storage area in an infeed conveyor direction, the direction of travel of the roller conveyer is neither parallel nor antiparallel to the infeed conveyor direction.

12. The storage module of claim 1, wherein said roller conveyer has two rollers with spaced apart axes and an endless belt disposed thereon.

13. A storage module for flat postal items, comprising:

a storage area;

a common roller conveyor unit for transferring postal items from a stream of postal items into the storage area and for extracting postal items from the storage area, the conveyer unit having two rollers with spaced apart axes and an endless belt disposed thereon, the endless belt having a conveying surface for conveying the postal items;

a feed stop having a stop surface disposed perpendicular to the conveying surface of the endless belt, the feed stop being movable so as to define an extraction opening between the conveying surface and the feed stop, the common roller conveyor for guiding the postal items in a direction of travel of the roller conveyor unit against the feed stop for transferring into the storage area, the roller conveyer for extracting a last one of the postal items stacked in the storage area, in the direction of travel of the roller conveyor unit, through the extraction opening; and the storage area including a separating knife configured for exerting a first pressure antiparallel to a stacking direction on at least part of the postal items stored in the storage area during transfer of the postal items into the storage area, and for exerting a second pressure antiparallel to the stacking direction on at least part of the postal items stored in the storage area during extraction of the postal items from the storage area.

* * * * *